United States Patent [19]

Swaroop

[11] 4,239,471
[45] Dec. 16, 1980

[54] THERMAL ALIGNMENT OF CORES AND CAVITIES IN MULTI-CAVITY INJECTION MOLDS

[75] Inventor: Nareshwar Swaroop, Mount Vernon, Ohio

[73] Assignee: The Continental Group, Inc., New York, N.Y.

[21] Appl. No.: 100,793

[22] Filed: Dec. 6, 1979

[51] Int. Cl.[2] ............................................. B29F 1/08
[52] U.S. Cl. .................................... 425/144; 249/64; 249/78; 249/81; 249/110
[58] Field of Search ................. 425/143; 425/143, 144, 425/147, 572, 588; 249/64, 59, 68, 78, 79, 81, 105, 107, 110

[56] References Cited

U.S. PATENT DOCUMENTS

| | | | |
|---|---|---|---|
| 2,637,882 | 5/1953 | Plott | 249/79 |
| 3,020,594 | 2/1962 | Makowski | 249/79 X |
| 3,159,678 | 12/1964 | Scott, Jr. et al. | 425/572 X |
| 3,173,175 | 3/1965 | Lemeloon | 249/78 X |
| 3,189,948 | 6/1965 | Whitney | 425/144 |
| 3,499,189 | 3/1970 | Perras | 425/144 |
| 3,520,026 | 7/1970 | Stidham et al. | 425/572 X |
| 3,583,467 | 6/1971 | Bennett et al. | 425/144 X |
| 3,671,159 | 6/1972 | Greenberg et al. | 249/107 X |
| 3,751,014 | 8/1973 | Waterloo | 425/144 X |
| 3,774,874 | 11/1973 | Clark | 249/68 X |
| 3,807,914 | 4/1974 | Paulson et al. | 425/144 |
| 3,911,251 | 10/1975 | Day | 425/144 X |
| 4,034,952 | 7/1977 | Stewart | 425/143 X |

Primary Examiner—J. Howard Flint, Jr.
Attorney, Agent, or Firm—Charles E. Brown

[57] ABSTRACT

This relates to an injection mold assembly wherein there is a plurality of cavities which are spaced from a center of the mold assembly and wherein each cavity has therein a core so that a thin wall article, such as a preform for a blow molded bottle, may be accurately formed by injection molding. Previously experienced differential in temperature and thus expansion differentials causing core-cavity misalignment are overcome in accordance with this invention by supplying the core retainer plate, which is normally cooler than the cavity retainer plate, with a heater for elevating the temperature thereof as required.

8 Claims, 2 Drawing Figures

THERMAL ALIGNMENT OF CORES AND CAVITIES IN MULTI-CAVITY INJECTION MOLDS

This invention relates in general to new and useful improvements in injection molding apparatus, and more particularly to a multi-cavity injection mold assembly wherein there is associated with each cavity a core carried by a core retainer plate.

Simultaneous and individual core to cavity alignment in a multi-cavity injection mold assembly is by far the most difficult in producing deep injection molded parts such as preforms for plastic bottles which are blow molded. The misalignment in an otherwise aligned tooling can occur both due to mechanical strains induced by clamping force and thermal strains arising from differential thermal heating (cooling) of various components of a multi-cavity tooling. Once the core becomes out of alignment with its cavity, even by a few mils, the eventual deflection of the core becomes grossly exaggerated depending upon the cantilever length of the core and the maximum injection pressures involved, resulting in unusable eccentric moldings.

The mechanical misalignment can be readily corrected in accordance with the misalignment problems. However, thermally induced misalignment is not only easy to overlook, but is also difficult to control by standard forced water circulation mold cooling techniques. Usually forced water circulation is employed to remove heat from the molding itself, not necessarily from the mold.

It has been found that when the number of cavities is quite large, for example eight, it is necessary not only to remove heat from the molding itself, but also from the tool components. It has been found that the core retainer plate lags behind the cavity retainer plate by more than 50° F., even though the cores and the cavities and their retaining plates were cooled by forced water circulation. The cavity retainer plate, being in the immediate vicinity of the hot manifold, tended to heat up unduly as compared to the core retainer plate. The aforementioned 50° F. plus temperature differential between the retainer plate for the cores and the retainer plate for the cavities induced differential thermal expansion of the retainer plates and resulted in a dissimilar pitch circle diameter of the core axes and the cavity axes (the cavities being arranged in a circular pattern) resulting in unduly thin wall sections on preforms radially inwardly with respect to the tooling.

It has been found that the aforementioned temperature differential difficulty can be readily solved by providing the core retainer plate with heating which is controlled to heat the core retainer plate to substantially the same temperature as the cavity retainer plate. The heating is preferably effected by means of electric heaters which are controlled by a control system including temperature sensors carried by the retainer plates and a comparator receiving inputs from the sensors and controlling the operation of the heaters.

The supplying of the core retainer plate with controlled heating permits a synchronized maintenance of the core and cavity retainer plates at the desired temperature levels, thereby eliminating the undesired thermal strains heretofore encountered.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
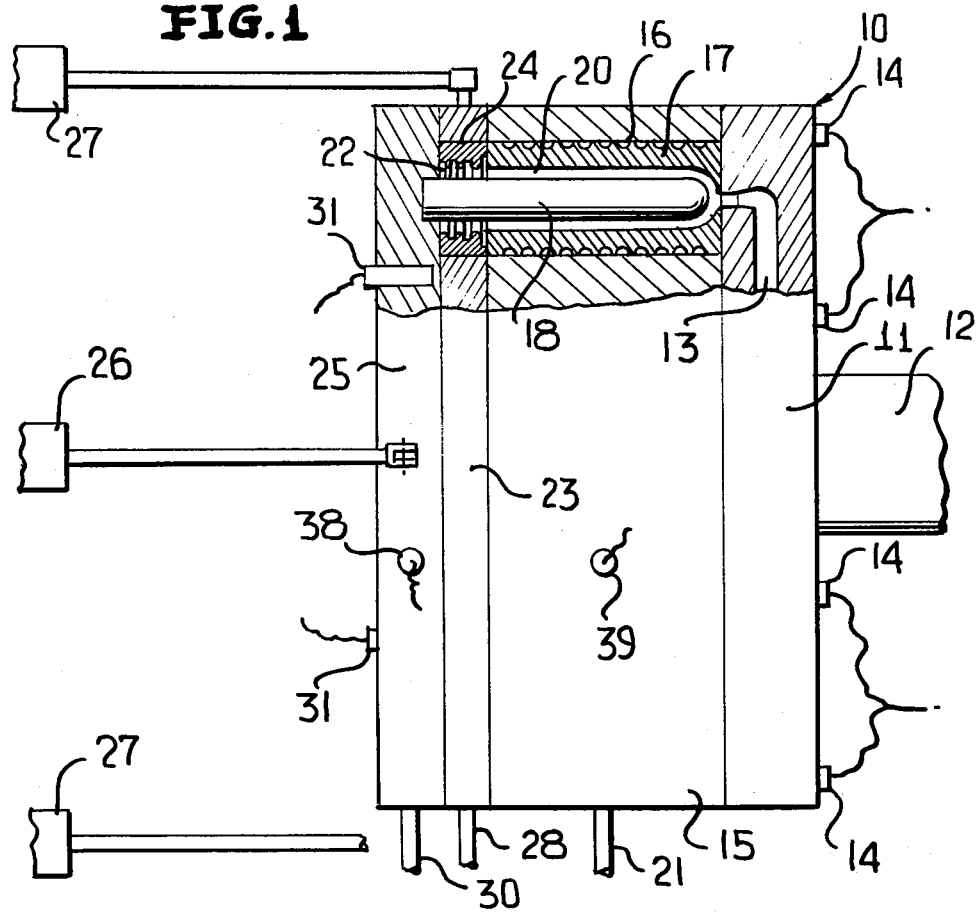
FIG. 1 is a schematic side elevational view with parts broken away and shown in section of a multi-cavity injection mold in accordance with this invention.

Referring now to the drawings in detail, it will be seen that there is illustrated in FIG. 1 a mold assembly generally of a conventional type incorporating therein the temperature controlling system of this invention. The injection mold assembly is generally identified by the numeral 10, and includes a hot runner manifold 11 which is coupled to a plasticizer 12 for receiving thermoplastic melt from the plasticizer. The hot runner manifold 11 is provided with a plurality of radiating runners 13 for directing the thermoplastic melt into individual cavities.

In order that the thermoplastic melt may be retained at a proper flow temperature, normally the hot runner manifold 11 will be provided with suitable heaters 14. Thus, not only is the manifold 11 heated by the thermoplastic melt passing therethrough, but is also maintained at a uniform high temperature by the heaters 14 so that there will be a minimum of temperature reduction in the thermoplastic melt as it flows from the plasticizer into the various cavities.

The hot runner manifold 11 is suitably clamped aganst one face of a cavity retainer plate 15. The plate 15 has formed therethrough a plurality of bores 16 which are preferably aligned in a circular pattern. Each bore 16 has seated therein a removable cavity 17. The illustrated cavities are of a configuration for cooperation with a core 18 for forming a preform 20 for a bottle.

A coolant (normally water) is circulated through the retainer plate 15 and around the cavities 17 by suitable piping 21. The coolant is necessary both to cool the cavity and the molding formed therein so that the molding may be removed with a minimal cycle time. The cooling of the cavity retainer plate 15 also aids in the cooling of the cavities. p When the injection molded preforms are bottle preforms, normally the preforms 20 are provided with a neck finish 22. Accordingly, there is disposed next to the retainer plate 15 a neck finish plate 23 which has seated therein neck ring assemblies 24 for cooperation with the cavities 16.

Finally, there is a core retainer plate 25 which carries the plural cores 18 for the plural cavities 16. The neck finish plate is generally constructed so that the neck ring assemblies 24 are opened to effect the removal of the preforms. Further, both the neck finish plate 23 and the core retainer plate 25 are mounted for movement away from the cavity retainer plate 15. Suitable fluid cylinders 26 are schematically illustrated and are attached to the core retainer plate 25 for moving the same to the left as required in the operation of the mold assembly 10. In a like manner, suitable fluid cylinders 27 are coupled to the neck finish plate 23 for axially shifting the same and for effecting relative movement between the neck finish plate 23 and the core retainer plate 25.

Suitable coolant lines 28 and 30 are coupled to the neck finish plate 23 and the core retainer plate 25, respectively.

When a mold assembly such as that specifically illustrated in FIG. 1 and as described above is operated, it is virtually impossible to control the flow of fluid through the various components of the mold assembly 10 to provide a uniform temperature in the various components. This is particularly true because of the face-to-face engagement of the hot runner manifold with the cavity retainer plate 15.

In accordance with this invention, the core retainer plate 25 is provided with a plurality of electric heaters 31. The heaters 31 will be of a sufficient number and position to provide for the uniform heating of the core retainer plate.

Figure 2:
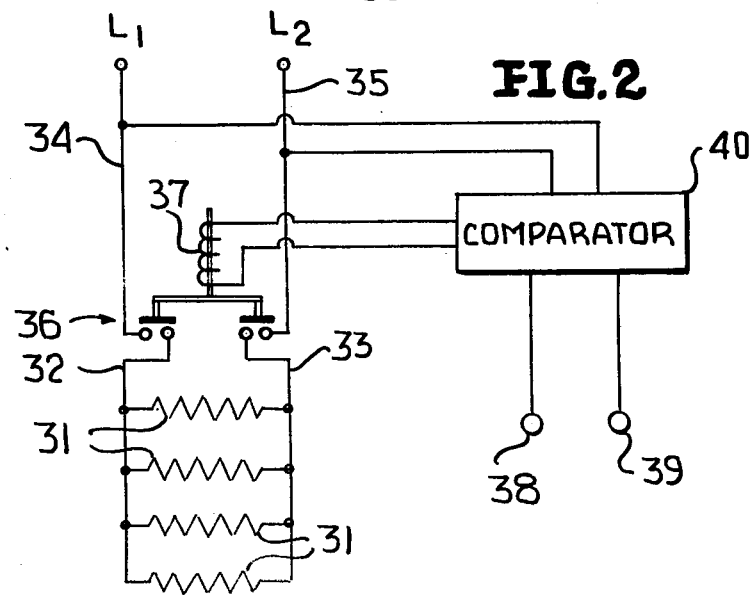
FIG. 2 is a wiring schematic showing the details of the heater means provided in accordance with this invention.

Reference is now made to FIG. 2 in particular. It will be seen that the heaters 31 are coupled in parallel between a pair of leads 32, 33 which, in turn, are connected to line members 34, 35 by a contact switch arrangement generally identified by the numeral 36.

The contact switch arrangement 36 is of a conventional type controlled by a solenoid 37. The solenoid 37 is energized, when required, to complete the circuit to the heaters 31 when the temperature differential between the retaining plates exceeds a predetermined figure.

The switch 37 is controlled by a comparator which is coupled to the lines 34, 35 and receives a signal from a pair of temperature sensors 38, 39 which are suitably mounted in the core retainer plate 25 and the cavity retainer plate 15, respectively, as is schematically illustrated in FIG. 1. The sensor devices 38, 39 have their outputs coupled to a conventional comparator 40 as inputs and the comparator being operable, upon comparing the outputs of the temperature sensors, to activate the heaters 31.

By heating the core retainer plate 25, the temperature of the core retainer plate is maintained substantially equal to that of the cavity retainer plate 15 and there is no thermal expansion misalignment, with the result that the core 18 remains centered in its respective cavity 16.

Although only a preferred embodiment of the mold assembly has been specifically illustrated and described herein, it is to be understood that minor variations may be made in the mold assembly and the means for heating the core retainer plate without departing from the spirit and scope of the invention as defined by the appended claims.

I claim:

1. In a multi-cavity injection mold assembly comprising a cavity retainer plate having therein a plurality of mold cavities, a core projecting into each mold cavity, and a core retainer plate; coolant means for cooling said mold cavities, said cavity retainer plate and said core retainer plate: the improvement comprising heating elements in said core retainer plate and control means for said heating elements for maintaining said core retainer plate at the same temperature as said cavity retainer plate.

2. The mold assembly of claim 1 wherein there is a hot runner manifold next adjacent said cavity retainer plate.

3. The mold assembly of claim 1 wherein there is a hot runner manifold next adjacent said cavity retainer plate, said hot runner manifold being fixed relative to said cavity retainer plate, and there are means for periodically moving said core retainer plate away from said cavity retainer plate.

4. The mold assembly of claim 1 wherein there is a hot runner manifold next adjacent said cavity retainer plate, and there is a neck finish plate intermediate said core retainer plate and said cavity retainer plate.

5. The mold assembly of claim 1 wherein there is a hot runner manifold next adjacent said cavity retainer plate, and there is a neck finish plate intermediate said core retainer plate and said cavity retainer plate, said hot runner manifold being fixed relative to said cavity retainer plate, and there are means for periodically moving said core retainer plate away from said cavity retainer plate.

6. The mold assembly of claim 1 wherein said heating elements are electrical heating elements.

7. The mold assembly of claim 1 wherein said heating elements are electrical heating elements, and said control means includes temperature sensors carried by said core retainer plate and said cavity retainer plate, and comparator means coupled to said temperature sensors for comparing the temperatures of said core retainer plate and said cavity retainer plate.

8. The mold assembly of claim 1 wherein said control means includes temperature sensors carried by said core retainer plate and said cavity retainer plate, and comparator means coupled to said temperature sensors for comparing the temperatures of said core retainer plate and said cavity retainer plate.

* * * * *